(12) United States Patent
Cao et al.

(10) Patent No.: US 8,914,372 B2
(45) Date of Patent: Dec. 16, 2014

(54) CLUSTERING CUSTOMERS

(75) Inventors: Heng Cao, Shanghai (CN); Jin Dong, Beijing (CN); Jacqueline Giang Huong Morris, Brooklyn, NY (US); Ming Xie, Beijing (CN); Wen Jun Yin, Beijing (CN); Bin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/432,361

(22) Filed: Mar. 28, 2012

(65) Prior Publication Data

US 2012/0254179 A1 Oct. 4, 2012

(30) Foreign Application Priority Data

Mar. 31, 2011 (CN) .......................... 2011 1 0080939

(51) Int. Cl.
*G06F 17/30* (2006.01)
*G06Q 30/02* (2012.01)

(52) U.S. Cl.
CPC ...................................... *G06Q 30/02* (2013.01)
USPC ..... 707/737; 707/748; 707/758; 707/E17.089

(58) Field of Classification Search
CPC ....................... G06F 17/30598; G06F 17/3053
USPC ........................... 707/737, 748, 758, E17.089
See application file for complete search history.

(56) References Cited

U.S. PATENT DOCUMENTS

| 6,016,497 | A * | 1/2000 | Suver ...................... 707/999.002 |
| 6,449,612 | B1 | 9/2002 | Bradley et al. |
| 6,510,436 | B1 * | 1/2003 | Hart ............................. 707/737 |
| 7,120,431 | B1 * | 10/2006 | Huo et al. ...................... 455/423 |
| 7,398,270 | B1 | 7/2008 | Choi et al. |
| 7,599,945 | B2 | 10/2009 | Ames et al. |
| 2002/0082932 | A1 * | 6/2002 | Chinnappan et al. ........... 705/26 |
| 2002/0111870 | A1 * | 8/2002 | Chinnappan et al. ........... 705/26 |
| 2003/0177066 | A1 * | 9/2003 | Zhang et al. ..................... 705/14 |

(Continued)

FOREIGN PATENT DOCUMENTS

WO 2008067543 A2 6/2008

OTHER PUBLICATIONS

Aharon Bar-Hillel, et al., "Learning a Mahalanobis Metric from Equivalence Constraints," Journal of Machine Learning Research 6; pp. 937-965; 2005.

(Continued)

*Primary Examiner* — Phong Nguyen
(74) *Attorney, Agent, or Firm* — Cantor Colburn LLP (57) ABSTRACT

A computer implemented method for clustering customers includes receiving a source set of customer records, wherein each customer record represents one customer, and each customer record includes at least one data attribute, and each data attribute has an attribute value; pre-processing the source set of customer records to generate a pre-processed set of customer records; executing a clustering algorithm on the pre-processed set of customer records to group the pre-processed set of customer records into clusters of a pre-defined number. The pre-processing comprises: determining the type of a customer in the source set of customer records; using a type attribute value to indicate the type of the customer in its customer record; normalizing data attribute values and type attribute values; weighting to the data attribute values and the type attribute values respectively to obtain weighted attribute values of the data attribute and weighted attribute values of the tune attribute.

4 Claims, 9 Drawing Sheets

(56) References Cited

U.S. PATENT DOCUMENTS

| | | | | |
|---|---|---|---|---|
| 2003/0212520 | A1* | 11/2003 | Campos et al. | 702/101 |
| 2005/0197926 | A1* | 9/2005 | Chinnappan et al. | 705/27 |
| 2008/0010132 | A1* | 1/2008 | Aaron et al. | 705/14 |
| 2009/0177540 | A1* | 7/2009 | Quatse | 705/14 |
| 2011/0093420 | A1* | 4/2011 | Rothenberg et al. | 706/45 |
| 2012/0254179 | A1* | 10/2012 | Cao et al. | 707/737 |

OTHER PUBLICATIONS

Jacob Kogan, et al., "Grouping MultidimensionalData: Recent Advances in Clustering," ACM-Springer; pp. 1-268; 2006.

Alexander Strehl and Joydeep Ghosh, "Relationship-Based Clustering and Visualization for High-Dimensional Data Mining," Informs Journal on Computing; pp. 1-23; 2002.

* cited by examiner

| Customer ID | age | income |
|---|---|---|
| 1 | 25 | 6000 |
| 2 | 30 | 10000 |
| 3 | 28 | 12000 |
| 4 | 35 | 7000 |

| Customer ID | type |
|---|---|
| 1 | 0 |
| 2 | 1 |
| 3 | 0 |
| 4 | 1 |

| Customer ID | age | income | type |
|---|---|---|---|
| 1 | 25 | 6000 | 0 |
| 2 | 30 | 10000 | 1 |
| 3 | 28 | 12000 | 0 |
| 4 | 35 | 7000 | 1 |

Fig. 4C

| T4A | | | | T4D | | |
|---|---|---|---|---|---|---|
| Customer ID | age | income | | Customer ID | age | income |
| 1 | 25 | 6000 | | 1 | 0.00 | 0.00 |
| 2 | 30 | 10000 | | 2 | 0.50 | 0.67 |
| 3 | 28 | 12000 | | 3 | 0.30 | 1.00 |
| 4 | 35 | 7000 | | 4 | 1.00 | 0.17 |

Fig. 4D

| Customer ID | type |
|---|---|
| 1 | 0 |
| 2 | 1 |
| 3 | 0 |
| 4 | 1 |

T4B

| Customer ID | type | T4E |
|---|---|---|
| 1 | 0 | |
| 2 | 0.5 | |
| 3 | 0 | |
| 4 | 0.5 | |

Fig. 4E

| T4D | | | | T4F | | |
|---|---|---|---|---|---|---|
| Customer ID | age | income | | Customer ID | age | income |
| 1 | 0.00 | 0.00 | | 1 | 0.00 | 0.00 |
| 2 | 0.50 | 0.67 | | 2 | 0.25 | 0.335 |
| 3 | 0.30 | 1.00 | | 3 | 0.15 | 0.50 |
| 4 | 1.00 | 0.17 | | 4 | 0.50 | 0.085 |

| Customer ID | age | income | type |
|---|---|---|---|
| 1 | 0.00 | 0.00 | 0 |
| 2 | 0.25 | 0.335 | 0.5 |
| 3 | 0.15 | 0.50 | 0 |
| 4 | 0.50 | 0.5 | 0.5 |

Fig. 4G

| Customer ID | age | income | type |
|---|---|---|---|
| 1 | 0 | 0 | 0 |
| 2 | 0.5 | 0.67 | 0 |
| 3 | 0.3 | 1 | 0 |
| 4 | 1 | 0.17 | 0 |

Fig. 4H

| CustomerID | age | income | type |
|---|---|---|---|
| 1 | 0 | 0 | 0 |
| 2 | 0 | 0 | 1 |
| 3 | 0 | 0 | 0 |
| 4 | 0 | 0 | 1 |

| Customer ID | cluster |
|---|---|
| 1 | 1 |
| 2 | 1 |
| 3 | 2 |
| 4 | 2 |

Fig. 6A

| | age | income | type |
|---|---|---|---|
| Center_1 | 0.0125 | 0.1675 | 0.25 |
| Center_2 | 0.325 | 0.2925 | 0.25 |

Fig. 6B

| distance | Center_1 | Center_2 |
|---|---|---|
| Customer 1 | 0.1062 | 0.2537 |
| Customer 2 | 0.1062 | 0.0699 |
| Customer 3 | 0.1737 | 0.1362 |
| Customer 4 | 0.2099 | 0.1362 |

Fig. 6C

| Customer ID | Cluster |
|---|---|
| 1 | 1 |
| 2 | 2 |
| 3 | 2 |
| 4 | 2 |

Fig. 6D

| distance | Center_1 | Center_2 |
|---|---|---|
| Customer 1 | 0 | 0.2952 |
| Customer 2 | 0.4248 | 0.0311 |
| Customer 3 | 0.2725 | 0.1710 |
| Customer 4 | 0.5072 | 0.1169 |

CLUSTERING CUSTOMERS

PRIORITY

This application claims priority to Chinese Patent Application No. 201110080939.X, filed 31 Mar. 2011, and all the benefits accruing therefrom under 35 U.S.C. §119, the contents of which in its entirety are herein incorporated by reference.

BACKGROUND

The invention relates to data analysis on databases, in particular, to data mining in commercial databases, and to clustering customers of businesses under scenarios of different applications.

In commercial practice, businesses wish to identify the characteristics of customers in order to manage them effectively. To conduct business effectively, it is desirable for businesses to mine and analyze the characteristics of customers. Thus, clustering techniques are frequently used to analyze the customers data stored in databases.

Clustering techniques are widely applied to fields of statistics, pattern identification, machine learning, telecom services, etc. With computer techniques and clustering techniques, a large number of data records in a database may be divided into K groups or clusters (where K is an integer). The similarity of two data records in the same cluster is greater than the similarity of two data records in different clusters. The commonly used algorithms in clustering techniques include K-means clustering algorithm and PAM (partitioning around medoids) algorithm, etc.

With a clustering technique, businesses may cluster customer records in a database or divide customer records (or customers) into different groups, then summarize the similar characteristics of customers in each group. Thereby, corresponding services may be provided for different customer clusters.

In some applications, it is assumed that the number (usually denoted as an integer K) of groups generated by clustering is known prior to execution of a clustering process. In some actual applications, the number of clusters is unknown prior to execution of a clustering process. The clustering process is tried with different K values, and finally a best K value is determined according to certain clustering criteria and a clustering result is obtained by running the clustering process with the K value.

The complexity of clustering algorithm depends on the number of data records in database, the number of attributes contained in each data record, the number of clusters K, and whether the value of K is known in advance. The process of performing clustering on customer records in database with clustering techniques often takes hours or even days. It is desirable for businesses to improve the efficiency of clustering customer records in database for specific applications.

SUMMARY

In one aspect, the invention provides a computer implemented method for clustering customers, comprising: receiving a source set of customer records, wherein each customer record in the set of customer records represents one customer, each customer record includes at least one data attribute, and each data attribute has an attribute value; pre-processing the source set of customer records to generate a pre-processed set of customer records; and executing a clustering algorithm on the pre-processed set of customer records to divide the pre-processed set of customer records into a pre-defined number of clusters, wherein the pre-processing comprises: determining the type of a customer represented by each record in the source set of customer records; using a type attribute to indicate the type of the customer in a corresponding customer record; normalizing data attribute values and type attribute values; and weighting the data attribute values and the type attribute values respectively to obtain weighted attribute values of the data attribute and weighted attribute values of the type attribute.

In another aspect, the invention provides a system for clustering customers comprising: a receiving device configured to receive a source set of customer records, wherein each customer record in the set of customer records represents one customer, each customer record includes at least one data attribute, and each data attribute has an attribute value; a pre-processing device configured to pre-process the source set of customer records to generate a pre-processed set of customer records; and a clustering device configured to execute clustering algorithm on the pre-processed set of customer records to divide the pre-processed set of customer records into a pre-defined number of clusters, wherein the pre-processing device comprises: a type representing device configured to determine the type of a customer represented by each record in the source set of customer records, and to use a type attribute to represent the type of the customer in a corresponding customer record; a normalizing device configured to normalize data attribute values and type attribute values; and a weighting device, configured to weight the data attribute values and the type attribute values respectively to obtain weighted attribute values of the data attribute and weighted attribute values of the type attribute.

BRIEF DESCRIPTION OF THE SEVERAL VIEWS OF THE DRAWINGS

Features and advantages of the present disclosure may be better understood through reading the following detailed description of illustrative embodiments with reference to drawings, in which:

FIGS. 4A-4I are schematic presentations of pre-processing a source set of customer records in accordance with an exemplary embodiment;

FIGS. 6A-6E are presentations of data processing in the process of executing K-means clustering algorithm in accordance with an exemplary embodiment.

DETAILED DESCRIPTION

As described above, in commercial practice, businesses wish to identify the characteristics of customers in order to manage them effectively. There is such a situation that, for example, a business has accumulated a certain amount of customers of a certain service or product. However, the business still wishes to increase the number of customers of the service or product. Therefore, the businesses may need to identify potential customers of the service or product in order to develop precise marketing activities targeting the potential customers. A possible way is to identify the potential customers based on the accumulated customers.

Taking banking as an example, one bank has accumulated a certain amount of customers of credit card. In the bank's database, there are stored the data of customers (e.g., the customers having payroll account) with the information of monthly income, age, etc. In addition, the information stored in the database can further identify which customers have credit cards issued by the bank, i.e., credit card customers. The bank wishes to identify other potential credit card customers according to the existing credit card customers in order to conduct marketing activities accurately and effectively. One way of identifying the potential credit card customers according to the existing credit card customers is to identify the customers with similar information as the existing credit card customers. A key point is to find the distinctive characteristics between the existing credit card customers and the potential customers.

Therefore, the bank may divide the customers (e.g., the customers having payroll account) into different clusters with clustering techniques and identify potential credit card customers from the clusters in which credit card customers are relatively concentrated. The customers in each cluster generated with clustering techniques are relatively similar, i.e., the non-credit card customers in the clusters in which credit card customers are concentrated are relatively similar to the credit card customers, and thus they are likely to become future credit card customers. Thus the non-credit card customers in the clusters in which credit card customers are concentrated can be identified as potential credit card customers.

Figure 1:
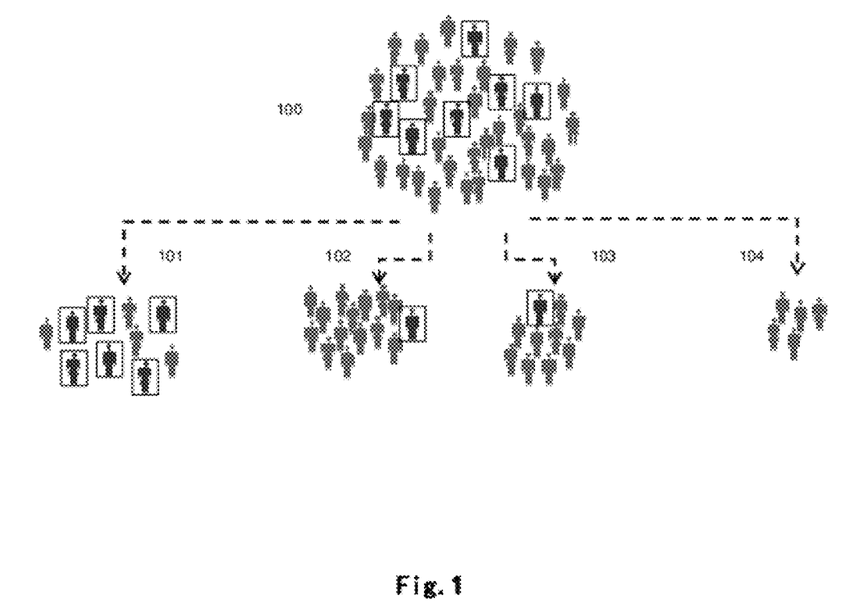
FIG. 1 is a presentation of the schematic diagram of a cluster set generated by clustering a set of customers.

The manner for identifying potential credit card customers based on existing credit card customers may be further illustrated by FIG. 1.

FIG. 1 is a presentation of the schematic diagram of groups generated by clustering a set of customers. The human figures in FIG. 1 represent the customers of a bank, wherein the boxed human figures represent the customers currently holding a credit card of the bank ("credit card customers" for short), and the human figures without a box represent the customers without a credit card of the bank ("non-credit card customers" for short).

The reference mark 10 denotes a set of customer records of the bank, wherein each customer record in the customer records set represents one customer, each customer record includes at least one data attribute (such as "age", "income"), and each data attribute has an attribute value (such as "age=30", "income=7000"). The customer records contained in the set 10 as shown represent 40 customers, wherein there are 8 credit card customers and 32 non-credit card customers.

By clustering the customers set 10 according to customers attribute (or customer records attribute), 4 customer clusters 101, 102, 103 and 104 will be generated. The distribution of the customers from the customers set 10 to the 4 clusters is shown in Table 1.

TABLE 1

|  | Cluster 101 | Cluster 102 | Cluster 103 | Cluster 104 |
| --- | --- | --- | --- | --- |
| Number of credit card customers | 6 | 1 | 1 | 0 |
| Number of non-credit card customers | 4 | 14 | 9 | 5 |
| Total number of customers | 10 | 15 | 10 | 5 |
| Purity | 60% | 6.7% | 10% | 0 |

For example, there are 10 customers in cluster 101, with 6 being credit card customers and 4 non-credit card customers.

Generally speaking, in the resulting groups generated by clustering a data point set, there is certain similarity between the data points in same groups. For example, for the groups generated by clustering customer set as shown in FIG. 1, the customer attribute values (e.g., age and income) are similar if two customers are in the same group.

One of the indices of evaluating the clustering result is dispersion. The dispersion is used to represent the similarity of the data points in the groups generated by clustering process. The larger the dispersion of the clusters, the less similarity among the data points in the clusters. The smaller the dispersion of the clusters, the larger similarity among the data points in the clusters. Dispersion is determined by data points, numbers of clusters, etc.

Besides dispersion, the embodiments also use purity as an index for evaluating the clustering result. The purity of cluster is the ratio of the number of data points of a certain type in the cluster to the total number of data points in the cluster. For example, the purity of each cluster listed in the last line of Table 1 is the ratio of the number of credit card customers to the total number of customers in the cluster. For example, the value "60%" in the second column in the last line is the purity of cluster 101, i.e., the ratio of the number of credit card customers to the total number of customers in cluster 101 is 6/10. The higher the purity of the cluster, the more concentrated the credit card customers are in the cluster.

In order to identify potential credit card customers according to existing credit card customers, the groups generated by clustering customers set are expected to have higher purity as well as less dispersion. As shown in table 1, the purity of cluster 101 is the highest. Thus cluster 101 may be considered as the object for developing credit card customers. Namely, 4 non-credit card customers in cluster 101 in the example may be identified as potential credit card customers.

Generally speaking, in the application of clustering customers, the information of customers used includes two categories. One category includes data attributes of customers, such as age and income of customers, etc., while the other category includes the type attribute of customers. Type attribute divides customers into two types: seed customers and non-seed customers. The method to divide customers using type attribute depends on specific application. In the example as shown in FIG. 1, the customers represented by boxed human figures are a kind of seed customers. Both data attribute and type attribute of customers can be obtained in customer records stored in database. In order to identify potential credit card customers based on "seed customers", the clusters generated in clustering customers set according to existing credit card customers are expected to have higher purity as well as less dispersion.

Figure 2:
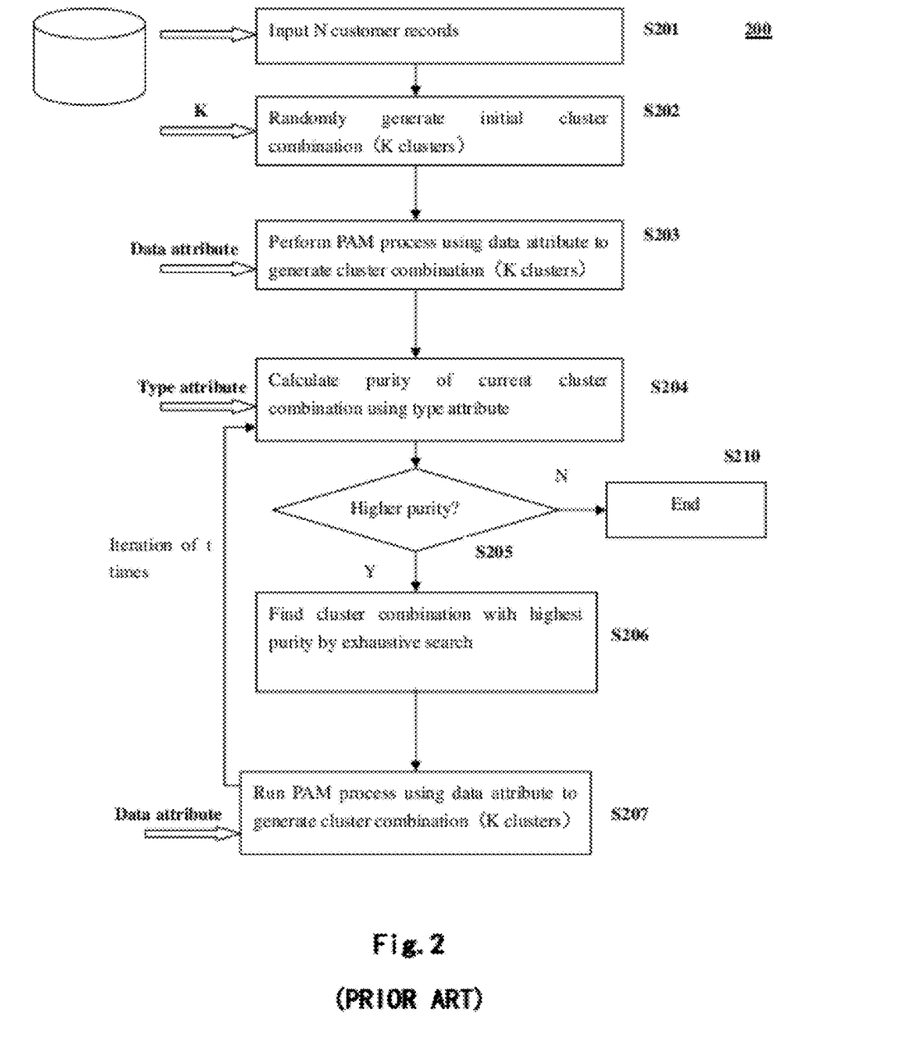
FIG. 2 is a schematic presentation of the flow chart of the process of clustering customers with an existing method.

FIG. 2 shows an existing method 200 for clustering customers. The method adopts a clustering technique to cluster customers set. The target is to make the dispersion of cluster as a result of clustering lowest and purity highest.

The process starts with block S201, which inputs a set of customer records concluding N customer records. Each customer record in the set of customer records represents one customer, each customer record includes at least one data attribute, and each data attribute has an attribute value.

Then in block S202, a cluster combination is randomly generated for the inputted customer records set. Blocks S201 and S202 are the initialization process of source data in order to run PAM process. In block S203, PAM process is performed on the cluster combination generated in block S202 using customer's data attributes, and generate current cluster combination, i.e., K clusters.

PAM algorithm is a commonly used clustering method similar as K-means algorithm. PAM algorithm may execute an iterative process for an inputted cluster combination (i.e., K clusters) and generate a cluster combination in each iteration, until one of following two conditions is satisfied:

(1) The dispersion of the current cluster combination does not reduce any more; or (2) There are contradictions between current cluster combination and inputted cluster combination, i.e., the center points of two clusters in the inputted cluster combination are allocated into a same cluster in the current cluster combination.

The last cluster combination will be taken as the output of the PAM process when the iteration stops.

In block S204, the purity of the current cluster combination is calculated by the type attribute of customers, i.e., the sum of squares of purity values of every cluster in the cluster combination.

In block S205, it is determined whether the purity of current cluster combination is greater than that of last cluster combination. If the purity of current cluster combination is greater than that of last cluster combination, process 202 goes ahead to block S206. As an exception, if the current cluster combination is generated in block S203, always supposing the purity of current cluster combination is bigger than that of last cluster combination, namely, process 200 goes ahead directly to block S206.

If the purity of current cluster combination is not bigger than that of last cluster combination, process 200 goes ahead to block S210. At this time, the current cluster combination is outputted as the result of process 200 and process 200 ends. In block S206, the cluster combination with highest purity is found out by exhaustive search. Block S206 further comprises block S206-1 and block S206-2.

Block S206-1, for each cluster i (i=1, 2, ..., K), replaces its center point with an arbitrary another point j (j=1, 2, ..., N) to obtain K*N center point combination.

The block can be shown by following pseudo-code.

---
For i=1 to K
  For j=1 to N
    Replace the center point of cluster i with point j
  EndFor
EndFor
Obviously, the computation complexity of block S206-1 is K*N.
---

In block S206-2, for each of combinations obtained by K*N center point combinations in block S206-1, it calculates the distance from each data point to each center point, and make each data point and its closest center point divided in a same cluster, so that K clusters are obtained. The total purity of the K clusters may be calculated according to the same method in block S204.

The cluster combination with the highest purity may be obtained by blocks S206-1 and S206-2.

It is required to calculate the distance K*N times in block S206-2. Therefore the computation complexity is K*N. Synthesizing the computation complexity of both blocks S206-1 and S206-2, the computation complexity of block S206 is (K*N)*(K*N), i.e. $K^2 * N^2$.

In block S207, it runs PAM process on the cluster combination generated in block S206 using the data attribute of customers, and generate current cluster combination, i.e., K clusters.

Then the process returns to block 204, and enter into next round circle. The circle will repeat limited t times.

The method shown in FIG. 2, using the data attribute and type attribute of customers separately, adopts a PAM algorithm and method of exhaustive search alternately, namely, clustering data attribute firstly, obtaining the clustering result with less dispersion, adjusting according to type attribute, and making the purity grow greater. Since adopting PAM algorithm and method of exhaustion alternately, there is very high computation complexity $O(N^2 * K^2 * t)$ for the method, wherein N is the total number of records in the set, K is the number of resulting clustering. In a practical application, the values of N and K are generally large. Therefore, it often takes a very long time to obtain the clustering result using this method.

Figure 3A:
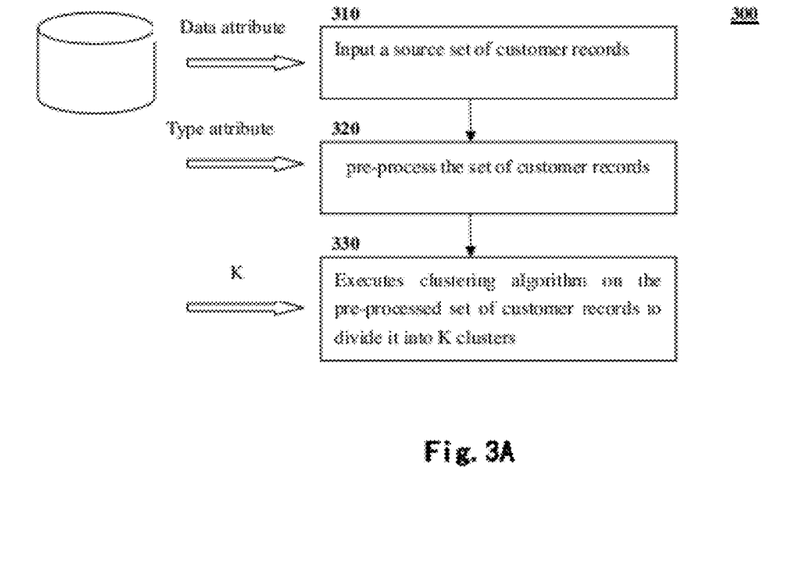
FIGS. 3A and 3B are schematic presentations of the flow chart of the process of clustering customers in accordance with an exemplary embodiment.
Figure 3B:
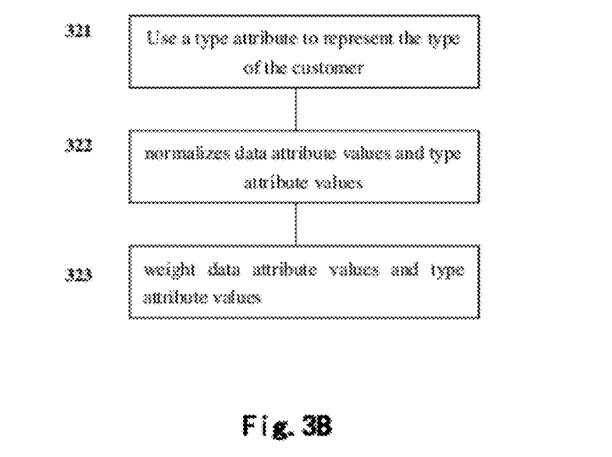

Compared with the state of the art, the method and system described herein may reduce computation complexity and adjust flexibly the dispersion and purity of the resulted clusters. In particular, the embodiments provide an improved method, which can shorten the time of obtaining the clustering result. FIG. 3 shows the flow chart of a process 300 of clustering customers according to an exemplary embodiment. As shown in FIG. 3, the process 300 starts with block 310, in which a source set of customer records is inputted. The set of customer records refers to a data set consisted of one or more customer records. The customer records are data records with certain data structure, in which the information regarding customers is recorded.

The customer records are commonly stored in the database on the nonvolatile storage of compute system. The inputting of a set of customer records refers to input one or more such customer records, from the database stored in the storage of computer system, to the memory of computer system (such as RAM). Each customer record in the source set of customer records represents one customer, includes at least one data attribute, and each data attribute has an attribute value.

Figure 4A:
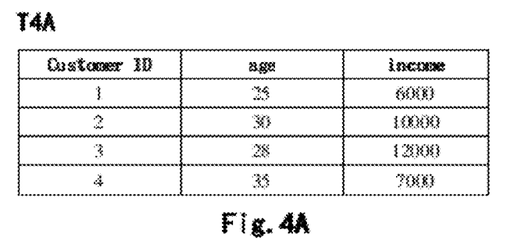

FIG. 4A schematically shows such a source set of customer records. The Table T4A as shown in FIG. 4A, represents a source set of customer records. There are 4 records in the source set of customer records, representing 4 customers respectively (Customer 1, Customer 2, Customer 3, and Customer 4), wherein each record has two attributes: "age" attribute and "income" attribute respectively. For example, the customer record attribute values representing Customer 1 are "age"=25 and "income"=6000 respectively.

In block 320, the method pre-processes the set of customer records to generate a pre-processed set of customer records. Pre-processing the set of customer records comprises 3 sub-blocks 321, 322 and 323 as shown in 3B.

In block 321, the method determines the type of a customer in the source set of customer records, and uses a type attribute to represent the type of the customer in its customer records. In the specific application, the type of a customer may be determined according to the purpose of clustering customers.

For example, there are two types of customers in Table T4A (FIG. 4A): Type 1-credit card customer, and Type 2-non-credit card customer.

Figure 4B:
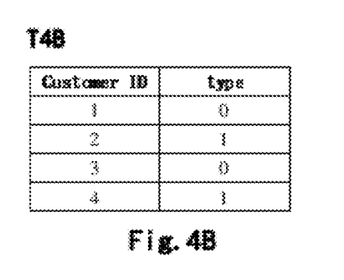

The result of block S321 is represented in Table T4B as shown in FIG. 4B. The second column of the table shows the type attribute of customer record, wherein the type attribute values of Customer 2 and Customer 4 are both "1", which means that Customer 2 and Customer 4 both belong to customers of Type 1, i.e., credit card customer. The type attribute values of Customer 2 and Customer 4 are both "0", which means that Customer 2 and Customer 4 belong to customers of Type 2, i.e., non-credit card customer.

Figure 4C:
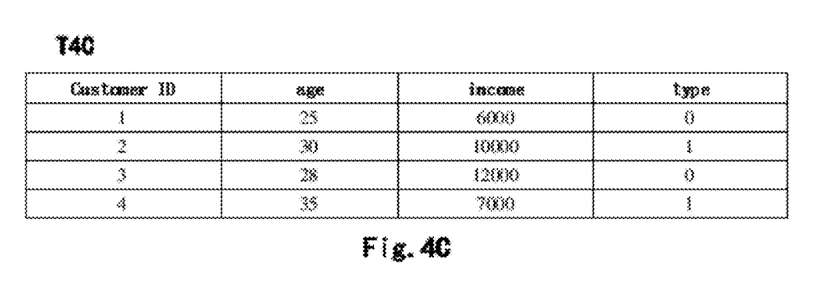

The result of block S321 is represented in Table T4C as shown in FIG. 4C. Table T4C is the result of combining table T4A and table T4B by customer ID.

According to an embodiment, using a type attribute to represent the type of the customer in a corresponding customer record comprises adding a type attribute in corresponding customer record.

For example, the source set of customer records as shown in FIG. 4A does not contain the attribute indicating whether the customer is credit card customer or not. In this case, this kind of information may be obtained from the database of bank and a type attribute is added in customer record in order to indicate whether or not the corresponding customer is credit card customer.

If the source set of customer records already contain the attribute indicating whether the customer is a credit card customer or not, it is only needed to label the attribute indicating whether the customer is credit card customer or not as a type attribute as shown in table T4B or table T4C. It is not necessary to add a new type attribute in customer records.

In block 322, the method normalizes data attribute values and type attribute values. The normalizing of an attribute refers to scale each value of an attribute (such as age) to the extent of [0,1] linearly and proportionally. More specifically, supposing the maximum value in the attribute is MAX, the minimum value is MIN, then the normalizing value of a given attribute value X is (X-MIN)/(MAX-MIN).

Taking the "age" attribute in table T4A as an example, the MAX of the attribute age is 35, and the MIN=25. Then the normalizing value of age value 25 of customer 1 is (25−25)/(35−25)=0, and the normalizing value of age value 30 of customer 2 is (30−25)/(35−25)=0.5. In the same manner, normalize all attribute values in table T4A. The result is as shown in table T4D in FIG. 4D.

The attribute value in table T4B is 0 or 1. When normalizing the attribute value in table T4B, the result remains no changed and still be represented by table T4B.

In block 323, the weights the data attribute values and the type attribute values respectively to obtain weighted attribute values of the data attribute and weighted attribute values of the tune attribute.

The specific method is, for data attribute, to multiply the normalized attribute values by a dispersion weighting factor α respectively. For type attribute, it is to multiply the normalized attribute values by a purity weighting factor β respectively.

Figure 4D:
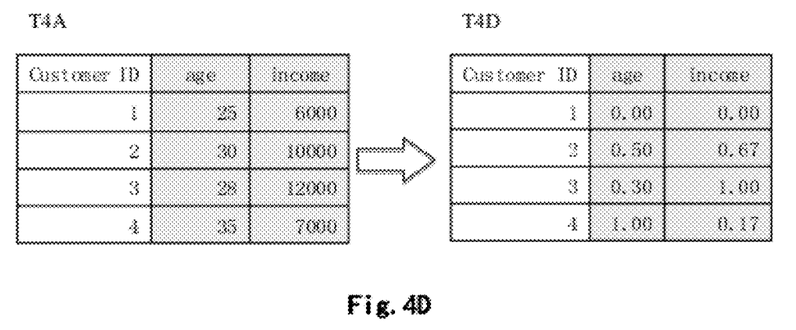

For example, as shown in 4F, setting α=0.5, it multiplies the attribute values in table T4D by a dispersion weighting factor α=0.5 respectively and obtains weighted attribute values. The result is as shown in table T4F.

Figure 4E:
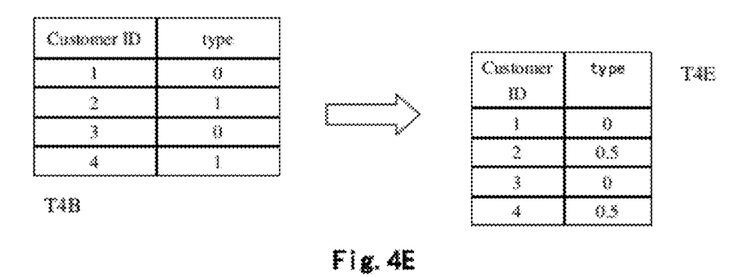
Figure 4F:
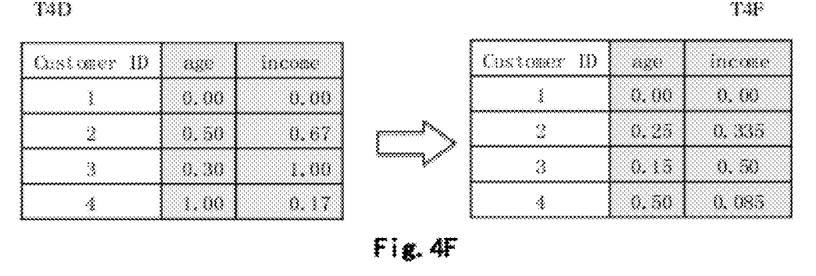

For example, as shown in FIG. 4E, setting β=0.5, it multiplies the attribute values in table T4B by a purity weighting factor β=0.5 respectively and obtains weighted attribute values. The result is as shown in table T4E.

Figure 4G:
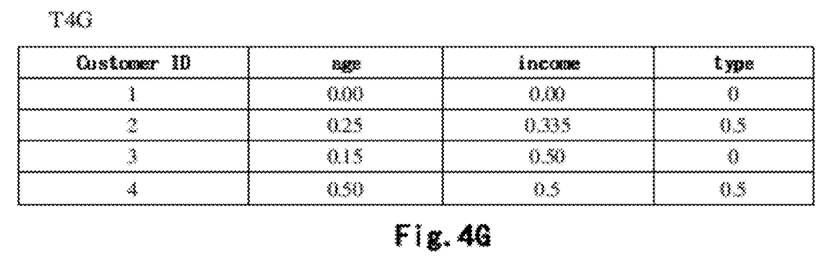

The pre-processed set of customer records is as shown in table T4G in FIG. 4G. Actually, the table is the result of combining table T4F and table T4E.

In block S330, the method executes a clustering algorithm on the pre-processed set of customer records to divide the pre-processed set of customer records into a pre-defined number of clusters. Execution of a clustering process on the pre-processed set of customer records will divide customers represented by the set of customer records into a pre-defined number of clusters.

In the following description, the letter "K" is used to represent the pre-defined number. Generally speaking, K is an integer selected from a specific section. In the following description, the set of clusters of K is also called a cluster combination generated by clustering process. The method performs a clustering process on the pre-processed set of customer records, and divides the customers represented by the set of customer records into K clusters.

According to one embodiment, in block 330, the method executes a clustering process on the pre-processed set of customer records by K-means clustering algorithm.

According to one embodiment of the invention, the relation between dispersion weighting factor α and purity weighting factor β is α+β=1 (0<=α<=1, 0<=β<=1).

Regarding the inputting of the clustering algorithm, the attribute values in the pre-processed set of customer records are the attribute values weighted by the dispersion weighting factor α and purity weighting factor β. This is one of the features of this invention. The weighting factors α and β are used to adjust the dispersion and purity of clustering result. The more of the relative value of dispersion weighting factor α, the smaller the dispersion of clustering result is, i.e., the data in sample clusters are more concentrated. The more of the relative value of purity weighting factor β, the bigger the purity of clustering result is.

K-means clustering algorithm is a commonly used clustering method. For the given N data points (for example, the 4 customer records in table T4G), the method divides all the data points into K clusters and makes the within-cluster sum of squared distances of the K clusters the least. The "within-cluster sum of squared distances" is presented by following formula:

$$\sum_{i=1}^{K} \sum_{j \in i} (j - \text{center\_i})^2 \qquad (1)$$

Wherein K is the number of resulting clusters, j is a data point in cluster i(i=1 . . . K), center_i is the center point of cluster i.

In formula (1), (j-center_i)$^2$ refers to the Euclidean distance from a data point j in cluster i to the center point of cluster i center_i.

$$\sum_{j \in i} (j - \text{center\_i})^2 \qquad (2)$$

Formula (2) shows the "within-cluster squared distances" of cluster i, namely, sum of distance from the center point of cluster i to all other data points in cluster i.

Therefore, the "within-cluster sum of squared distances" shown in formula 1 is the sum of "within-cluster squared distances" of each cluster in K clusters.

In the following, we still take table T4G, the pre-processed set of customer records as the object, and combine the schematically flow chart of FIG. 5, to illustrate the embodiment using K-means clustering algorithm executing clustering process.

Preset K=2, namely, to divide the 4 customer records in table T4G (representing customer 1-4) into 2 clusters (K=2).

Figure 5:
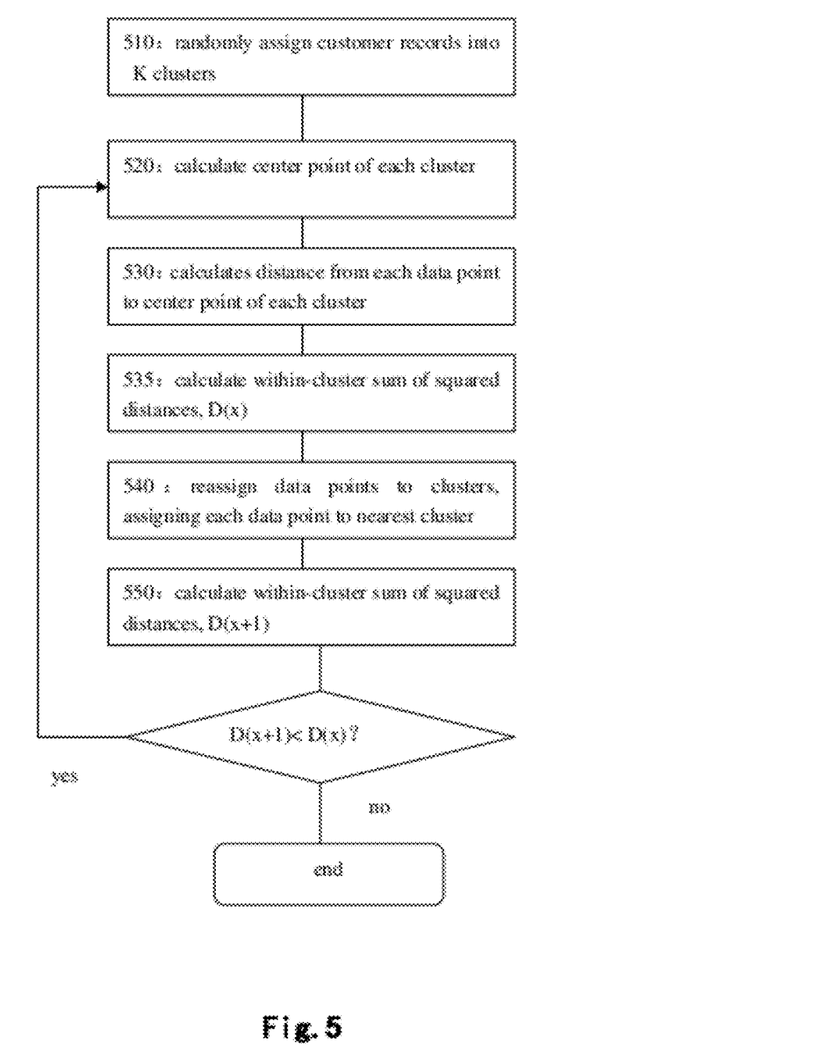
FIG. 5 is a presentation of the flow chart of execution of K-means clustering algorithm in accordance with an exemplary embodiment.

As shown in FIG. 5, the clustering process using K-means clustering algorithm is divided into 5 blocks 510-550.

Figure 6A:
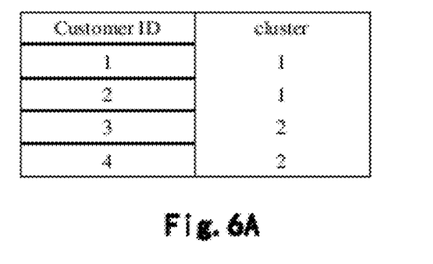

Block 510 is an initialization step. It assigns a cluster label for each customer record randomly. For example, as shown in 6A, assign customer 1 and customer 2 into cluster 1, and customer 3 and customer 4 into cluster 2.

In block 520, the method calculates the center point of each cluster. The center point of each cluster is the average value of all data points in the cluster.

In the embodiments, each customer record is a data point. Namely, a data point represents a customer or a customer record. The data points are expressed by multidimensional arrays. The content of multidimensional arrays is attribute values of customer records. For example, the data point corresponding to the customer record of the customer 2 in Fig.T4G is (age: 0.25, income: 0.335, type: 0.5).

Figure 6B:
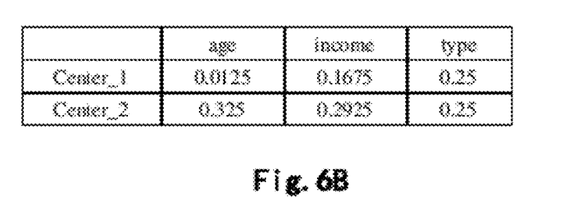

According to the distribution in 2 clusters of customer records shown in FIG. 6A, the center point of each cluster can be calculated. The result of calculation is as shown in FIG. 6B. Wherein, Center_1 shows the center point of cluster 1 and Center_2 shows the center point of cluster 2. For example, cluster 1 contains two data points:

(age: 0.00; income: 0.00; type: 0); (age: 0.25; income: 0.335; type: 0.5).

The center point of cluster 1 is:

<age: (0.00+0.0125)/2; income: (0.00+0.335)/2; type(0+0.5)/2>, i.e.

<age: 0.0125; income: 0.1675; type:0.25>.

In block 530, the method calculates the distance from each data point to the center point of each cluster. The calculation result is shown as the distance matrix in FIG. 6C. For example, in the distance matrix, the value 0.1062 in the line where customer 1 lies represents the distance from data point of customer 1 to the center point of cluster 1, Center_1.

Figure 6C:
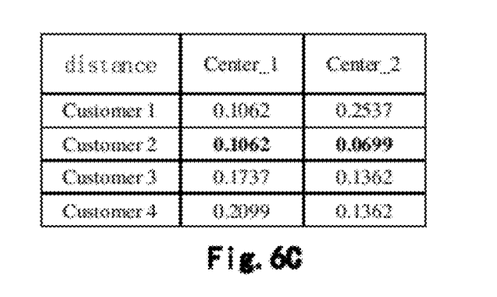

The distance is calculated by following formula:

$$\sqrt[2]{(0.00 - 0.0125)2 + (0.00 - 0.1675)2 + (0 - 0.25)**2} = 0.1062$$

Similarly, the value 0.2537 in the line where customer 1 lies represents the distance from data point of customer 1 to the center point of cluster 2, Center 2.

In block 535, it calculates the "within-cluster sum of squared distances", D(X), of currently K (K=2) clusters.

Firstly, by the distance matrix as shown in FIG. 6C, according to the formula (2) as stated above, it calculates the "within-cluster squared distances" of cluster 1 and "within-cluster squared distances" of cluster 2.

"within-cluster squared distances" of cluster 1=(0.1062+0.1062);

"within-cluster squared distances" of cluster 2=(0.1362+0.1362).

Again according to formula (1) as stated above, in the condition of currently cluster distributing, calculate the "within-cluster sum of squared distances", D(X) is:

(0.1062+0.1062)+(0.1362+0.1362)=0.4848.

Figure 6D:
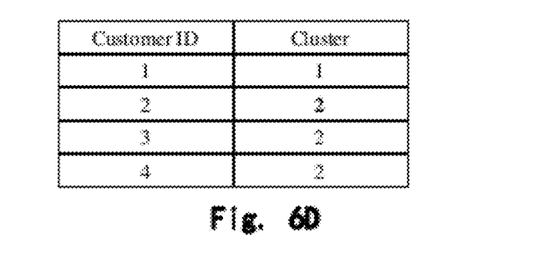

In block 540, the method reassigns data points to clusters. The rule of reassignment is to reassign a data point to the cluster whose center point is nearest to the data point. For example, in FIG. 6C, the distance from customer 2 to Center_2 is closer. According to the rule, the method assigns customer 2 to cluster 2. The cluster combination reassignment is as shown in FIG. 6D.

In block 550, calculate the "within-cluster sum of squared distances" of K clusters after reassignment, D(X+1).

If the "within-cluster sum of squared distances" of K clusters after reassignment, D(X+1), is smaller than the "within-cluster sum of squared distances" of K clusters before reassignment, D(X), then it returns to block 520 to continue iteration. Otherwise, the K cluster reassignment is the final clustering result.

For the current example, the "within-cluster sum of squared distances" of the cluster combination after the reassignment in block 540 D(X+1)=0.3190, while the "within-cluster sum of squared distances" of the cluster combination prior to the reassignment D(x)=0.4848, i.e. D(x+1)<D(x), thus the process returns to V520.

Figure 6E:
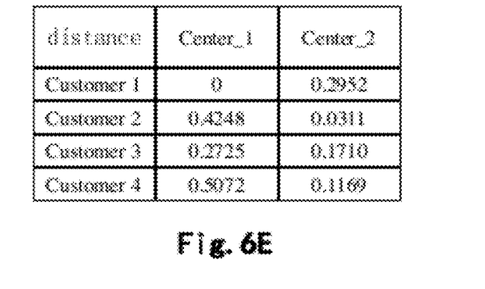

After the blocks 520 and 530, the method obtains the new distance matrix as shown in FIG. 6E. The clusters are still as shown in FIG. 6D. Its "within-cluster sum of squared distances" D(x)=0.3190.

In block 540, it carries out the second round reassignment according to the distance matrix as shown in FIG. 6E.

From FIG. 6E the method knows the data point has been distributed into cluster 2 even though the distance (0.0311) from data point representing customer 2 to the center point Cneter_2 of cluster 2 is nearer than the distance (0.4248) to the center point Cneter_1 of cluster 1. According to the rule of reassignment, there is no need to reassign the data points. Similarly, there is no need to reassign the data points representing customers 3 and 4, as well as customer 1. Therefore, the performing of block 540 does not change the distribution in the two clusters for the data points as shown in FIG. 6D. If block 550 is carried out, the calculated "within-cluster sum of squared distances" of K clusters, D(X+1) still equals to 0.3190.

Since D(X+1) is not smaller than D(X), the iteration ends. The final clustering result is still as shown in FIG. 6D. Namely, cluster 1 contains the customer records of customer 1, and cluster 2 contains the customer records of customer 2, 3 and 4.

According to one embodiment, after block 330, it can select clusters with higher purity from the pre-defined number (K) of clusters, and output data attribute values of source customer records in the clusters. The purity of a cluster is the ratio of the number of customer records with specified type attribute in the cluster to the total number of customer records in the cluster.

Outputting data attribute value of source customer records in the clusters with higher purity is helpful to find the common characteristics between the customers having credit card and the customers to be identified.

From Table T4B of FIG. 4B, we can know that, customer 1 and 3 are non-credit card customers, and customer 2 and customer 4 are credit card customers. It is not difficult to calculate that the purity of cluster 1 is 0, the purity of cluster 2 is 2/3=67%. That the purity of cluster 2 (67%) is higher indicates credit card customers in cluster 2 comparatively concentrate. Thus we can conclude that even though customer 3 is not a currently credit card customer, it is of high similarity with many credit card customers. If the bank wants to develop credit card customers, customer 3 should be considered as potential credit card customers.

According to embodiments, the method helps reduce the computation complexity by normalizing data attribute and type attribute in a clustering algorithm by pre-processing the source set of customer records. For those skilled in the art, it is not difficult to conclude that the computation complexity is $O(N*K*t)$ according to the method of embodiments of the invention, which is far lower than the computation complexity $O(N^2*K^2*t)$ of the method of prior art as shown in FIG. 2.

According to embodiments, the dispersion and purity of clusters of clustering result can be adjusted flexibly by adjusting the relatively weights of data attribute and type attribute. Thus the cluster or cluster combination satisfying in desperation and purity are easily found.

In the example above, when adding weights to the data attribute values and the type attribute values respectively in block 323, the weighting factors selected are $\alpha=0.5$, $\beta=0.5$. Such combination of weighting factors is to balance dispersion and purity. In practical application, it generally takes $\alpha=0.5$, $\beta=0.5$ as initial selection. Under this condition of selection, if the dispersion and purity of clusters generated in clustering do not meet the requirement, then it may re-adjust the values of $\alpha$ and $\beta$ according to the request for dispersion and purity. In the following, the effect brought by adjusting $\alpha$ and $\beta$ is described with two supposed extreme example.

Figure 4H:
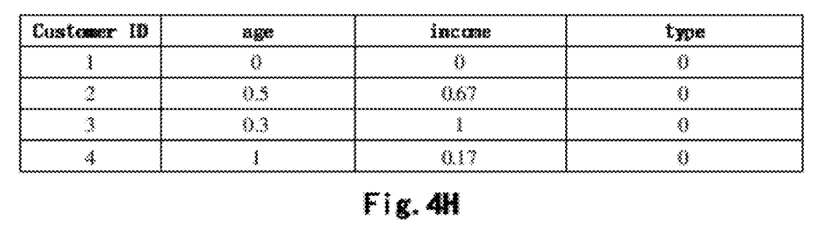

Supposing in block 323 (FIG. 3) to select $\alpha=1$, $\beta=0$, then the pre-processed set of customer records will be as shown in FIG. 4H. In this case, the values of type attribute of all customer records are 0. Thus in the process executed later shown in FIG. 5, it will cluster according to attributes of "age" and "income", so as to ensure the dispersion of clusters generated is the least.

Figure 4I:
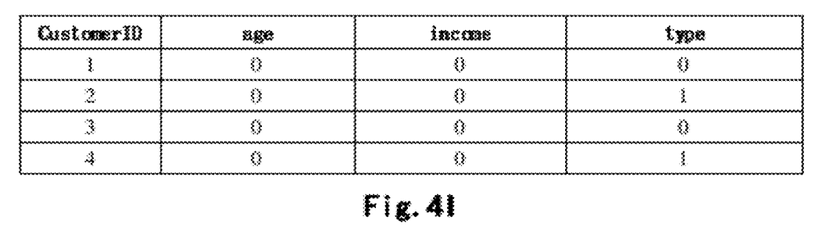

Supposing in block 323 to select $\alpha=0$, $\beta=1$, then the pre-processed set of customer records will be as shown in FIG. 4I. In this case, the values of type attribute of all customer records are 0. Thus in the process executed later shown in FIG. 5, it will clusters according to only type attribute, so as to ensure the purity of clusters generated is the most. Namely, either the type of the customer records in clusters is 1 or 0.

From the two special examples above, we can see that the dispersion and purity of clusters may be adjusted flexibly by adding weights to data attribute and type attribute respectively according to the method of embodiments of the invention which has obvious technical effects.

Figure 7:
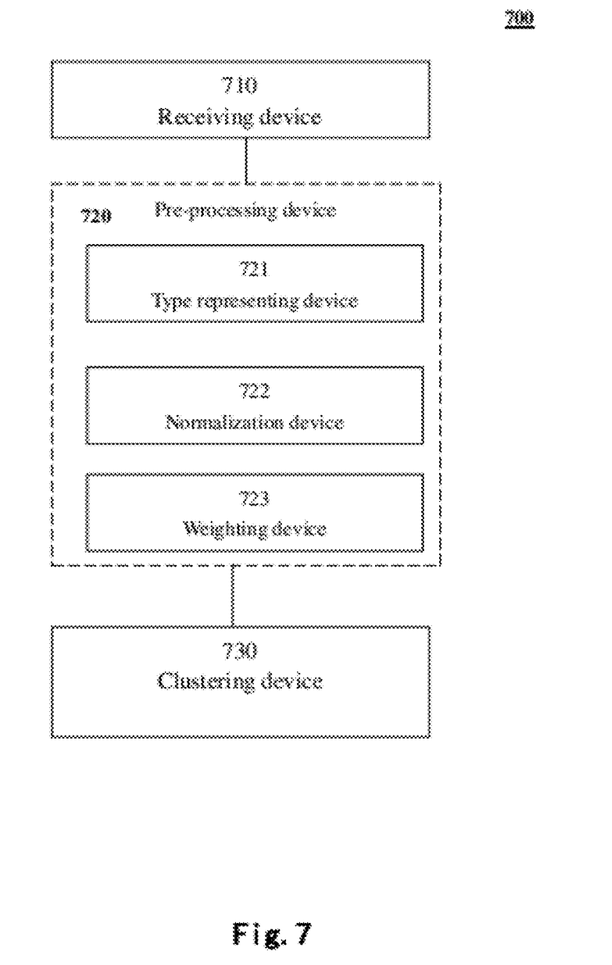
FIG. 7 is a schematic presentation of the block diagram of the system for clustering customers in accordance with an exemplary embodiment.

A computer implemented method for clustering customers according to embodiments is described above. FIG. 7 is a schematic presentation of the block diagram of the system 700 for clustering customers according to embodiments.

As shown in FIG. 7, the system 700 for clustering customers comprises: receiving device 710, pre-processing device 720 and clustering device 730.

Receiving device 710 is configured to receive a source set of customer records, wherein each customer record in the set of customer records represents one customer, each customer record includes at least one data attribute, and each data attribute has an attribute value;

Pre-processing device 720 is configured to pre-process the source set of customer records to generate a pre-processed set of customer records;

Clustering device 730 is configured to execute clustering algorithm on the pre-processed set of customer records to divide the pre-processed set of customer records into a pre-defined number of clusters.

The pre-processing device comprises a type representing device 721, a normalizing device 722 and a weighting device 723:

The type representing device 721 is configured to determine a type of customer represented by each record of the source set of customer records, using a type attribute to represent the type of the customer in a corresponding customer record.

The normalizing device 722 is configured to normalize data attribute values and type attribute values.

The weighting device 723 is configured to weight the data attribute values and the type attribute values respectively to obtain weighted attribute values of the data attribute and weighted attribute values of the type attribute.

According to one embodiment, the type representing device 721 is further configured to add a type attribute in corresponding customer record.

According to one embodiment, the weighting device 723 is configured to weight the attribute values of the data attribute using a dispersion weighting factor $\alpha$, add weight the values of the type attribute using a purity weighting factor $\beta$, wherein $\alpha+\beta=1$.

According to one embodiment of the invention, the clustering algorithm executed by the clustering device is K-means clustering algorithm.

According to one, the pre-defined number is an integer selected from a specific section.

According to one embodiment, the system further comprises a outputting device (not shown in the figure), which is configured to select clusters with higher purity from the pre-defined number of clusters, and output data attribute values of source customer records in the clusters, wherein the purity of a cluster is the ratio of the number of customer records with specified type attribute in the cluster to the total number of customer records in the cluster.

A system for clustering customers according to an embodiment is described above. Since a computer implemented method for clustering customers according to the embodiment of the invention has been described in detail in foregoing paragraphs, in the above description for system, the obvious duplication with the method described or the contents derived easily from the description of the method are omitted.

It should be noted that the above depiction is only exemplary, not intended for limiting the present embodiments. In other embodiments of, this method may have more, or less, or different steps, and numbering the steps is only for making the depiction more concise and much clearer, but not for stringently limiting the sequence between each step, while the sequence of steps may be different from the depiction. For example, in some embodiments, the above one or more optional steps may be omitted. Specific embodiment of each step may be different from the depiction. All these variations fall within the spirit and scope of the present invention.

The present invention may adopt a form of hardware embodiment, software embodiment or an embodiment comprising hardware components and software components. The present invention may be implemented in a computer system centrally or in a distributed manner. And in the distributed manner, different components are distributed in a plurality of interconnected computer systems. Any computer system or other apparatus suitable for implementing the method as described herein is suitable. A typical combination of hardware and software may be a general purpose computer system with a computer program which, when being loaded and executed, controls the computer system to implement the method of the present invention and constitute the apparatus of the present invention.

The present invention may also be embodied in a computer program product which comprises all features enabling the implementation of the method as described herein and, when loaded into a computer system, is capable of performing the method.

The present invention has been specifically illustrated and explained with reference to embodiments. Those skilled in the art shall appreciate that various modifications and alterations thereto in form and details may be made without departing from the spirit and scope of the present invention.

The invention claimed is:

1. A system for clustering customers, comprising:
a receiving device, configured to receive a set of customer records, wherein each customer record in the set of customer records represents one customer, each customer record includes at least one data attribute, and each data attribute has a data attribute value;
a pre-processing device, configured to pre-process the set of customer records to generate a pre-processed set of customer records;
wherein, to pre-process the set of customer records, the pre-processing device is further configured to:
determine the type of the customer represented by each record in the set of customer records;
use a type attribute to represent the type of the customer in the corresponding customer record, wherein the type attribute indicates whether the corresponding customer is a seed customer or a non-seed customer;
normalize the data attribute values and the type attribute values; and
weight the data attribute values and the type attribute values, wherein the weighting comprises multiplying the data attribute values by a dispersion weighting factor and multiplying the type attribute values by a purity weighting factor;
a computer processor, configured to execute a clustering algorithm on the pre-processed set of customer records to cluster the pre-processed set of customer records into a pre-defined number of clusters, wherein each of the clusters comprises two or more customer records representing two or more customers, and wherein each pre-processed customer record in the pre-processed set of customer records being clustered comprises at least a normalized and weighted data attribute and a normalized and weighted type attribute;
wherein the dispersion weighting factor used to weight the data attribute values and the purity weighting factor used to weight the type attribute values are adjustable to affect the dispersion and purity of a clustering result of the clustering algorithm applied to the set of customer records.

2. The system of claim 1, wherein the sum of the dispersion weighting factor used to weight the data attribute values and the purity weighting factor used to weight the type attribute values is 1.

3. The system of claim 1, wherein the computer processing device is configured to divide the customer records into the current set of clusters by using a K-means clustering algorithm.

4. The system of claim 3, further comprising:
a mechanism configured to select clusters with higher purity from the pre-defined number of clusters, and to output data attribute values of customer records in the clusters, wherein the purity of a cluster is the ratio of the number of customer records with a specified type attribute in the cluster to the total number of customer records in the cluster.

* * * * *